(12) United States Patent
Nishida

(10) Patent No.: US 8,018,207 B2
(45) Date of Patent: Sep. 13, 2011

(54) SWITCHING REGULATOR

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 12/203,367

(22) Filed: Sep. 3, 2008

(65) Prior Publication Data

US 2009/0066309 A1   Mar. 12, 2009

(30) Foreign Application Priority Data

Sep. 12, 2007   (JP) .................................. 2007-236580

(51) Int. Cl.
   *G05F 1/10*   (2006.01)
(52) U.S. Cl. ........................................ 323/222; 323/282
(58) Field of Classification Search .................. 323/222, 323/224, 225, 239, 282–288, 271–272; 363/21.04, 363/21.12, 80, 87, 89, 68, 96; 307/64, 66, 307/87

See application file for complete search history.

(56) References Cited

U.S. PATENT DOCUMENTS

| 4,634,956 A | * | 1/1987 | Davis et al. | .................... 323/222 |
| 5,814,952 A | * | 9/1998 | Maige et al. | .................. 315/371 |

FOREIGN PATENT DOCUMENTS

| JP | 2007-4995 | 1/2007 |
| JP | 2007-140573 | 6/2007 |

* cited by examiner

*Primary Examiner* — Rajnikant B Patel
(74) *Attorney, Agent, or Firm* — Cooper & Dunham LLP

(57) ABSTRACT

A switching regulator is disclosed that uses a non-linear amplifier and is capable of PWM control operation at high frequencies with a simple circuit configuration and without increasing current consumption. The switching regulator includes a switching unit, an inductor, a rectification unit, and a control circuit that controls the switching of the switching unit so that the output voltage of the switching regulator becomes a constant voltage. The control circuit uses a pulse signal to perform PWM control on the switching unit. The pulse signal is generated by amplifying an error voltage between the output voltage and a reference voltage at a gain variable in response to a voltage of a saw-tooth waveform signal.

3 Claims, 4 Drawing Sheets

//]: #

SWITCHING REGULATOR

BACKGROUND

1. Technical Field

This disclosure relates to a switching regulator constituting a DC-DC converter for constant voltage output control, and particularly relates to a switching regulator using a non-linear amplifier and thus capable of PWM control operation at high frequencies.

2. Description of the Related Art

FIG. 4 is a circuit diagram illustrating a circuit configuration of a switching regulator of the related art.

For details of the switching regulator in FIG. 4, for example, reference can be made to Japanese Laid Open Patent Application No. 2007-4995.

In FIG. 4, error comparators for use of voltage adjustment and current adjustment are employed, and PWM control for the voltage control and current control is carried out by voltage comparison between a triangular wave output from an oscillator OSC and output voltages from the error comparators.

However, in the PWM control of the related art, a PWM comparator is required to generate the error comparators and PWN pulses, and at high frequencies, it is necessary to increase current consumption of the comparators in order to reduce delay of the comparators.

BRIEF SUMMARY

A preferred embodiment of the present invention may provide In an aspect of this disclosure, there is provided a switching regulator using a non-linear amplifier and capable of PWM control operation at high frequencies with a simple circuit configuration and without increasing current consumption.

According to another aspect, there is provided a switching regulator which converts an input voltage supplied to an input terminal to a predetermined constant voltage and outputs the constant voltage through an output terminal as an output voltage, comprising:

a switching unit that performs switching according to an input control signal;

an inductor that is charged by the input voltage in response to the switching of the switching unit;

a rectification unit that discharges the inductor when the switching unit is switched OFF and the charging of the inductor stops;

a control circuit that controls the switching of the switching unit so that the output voltage becomes the constant voltage, wherein the control circuit uses a pulse signal to perform PWM control on the switching unit, said pulse signal being generated by amplifying an error voltage between the output voltage and a predetermined reference voltage at a gain variable in response to a voltage of a predetermined saw-tooth waveform signal.

As an embodiment, the control circuit includes:

a saw-tooth waveform generation circuit that generates and outputs the saw-tooth waveform signal; and an error amplification circuit that amplifies the error voltage between the output voltage and the predetermined reference voltage to generate and output the pulse signal, and changes a gain according to the saw-tooth waveform signal output from the saw-tooth waveform generation circuit.

As an embodiment, the error amplification circuit includes:

a differential amplifier circuit that receives the output voltage and the reference voltage through corresponding input terminals; and a gain control circuit that controls the gain of the differential amplifier circuit according to the saw-tooth waveform signal output from the saw-tooth waveform generation circuit, wherein the gain control circuit, according to the saw-tooth waveform signal, changes a bias current to be supplied to each of input transistors constituting a differential pair of the differential amplifier circuit, the output voltage and the reference voltage being input in association with each other to corresponding control electrodes of the input transistors.

As an embodiment, the differential amplifier circuit includes:

the input transistors constituting a differential pair;

a constant current source that supplies a predetermined constant current to the input transistors; and a plurality of variable resistors which resistors have resistance variable in response to an input control signal, and act as loads of the corresponding input transistors, wherein the gain control circuit allows the resistance of the variable resistors to be variable according to the saw-tooth waveform signal.

As an embodiment, each of the variable resistors includes a transistor, and a control signal from the gain control circuit is input on control electrodes of the transistors, and the gain control circuit allows the resistance of the transistors in an ON state to be variable according to the saw-tooth waveform signal.

The aforementioned control circuit performs PWM control on the switching unit by using a pulse signal, which is generated by amplifying an error voltage between the output voltage and a predetermined reference voltage at a gain variable in response to a voltage of a predetermined saw-tooth waveform signal. Thus, it is not necessary to provide a comparator for PWM modulation of an error signal obtained by amplifying the error voltage between the output voltage and the reference voltage, so that the circuit structure is simple, and it is possible to perform PWM control at high frequencies without increasing current consumption.

The aforementioned and other aspects, features, and advantages will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
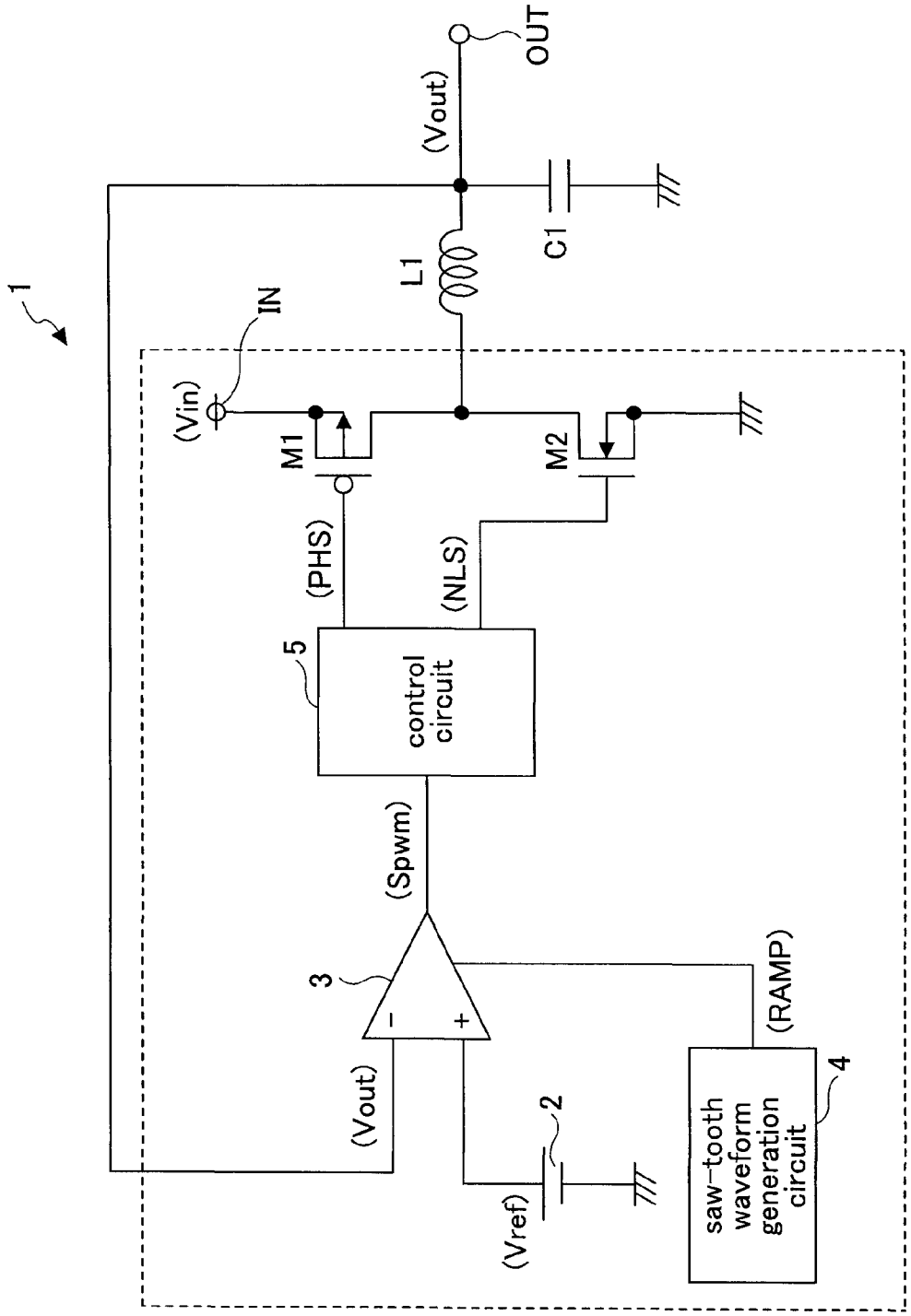
FIG. 1 is a block diagram illustrating a switching regulator 1 according to an embodiment of the present invention.

FIG. 1 is a block diagram illustrating a switching regulator 1 according to an embodiment of the present invention.

As shown in FIG. 1, the switching regulator 100 is a synchronization rectification step-down switching regulator, which converts an input voltage Vin at an input terminal IN to a certain constant voltage, and outputs the constant voltage through an output terminal OUT as an output voltage Vout.

The switching regulator 1 includes a switching transistor M1, which is a PMOS transistor and performs switching operations for control of output of the input voltage Vin, and a synchronization rectification transistor M2, which is an NMOS transistor.

In addition, the switching regulator 1 includes a reference voltage generation circuit 2 which generates a certain reference voltage Vref, an inductor L1, a smoothing capacitor Cl, an error amplification circuit 3, a saw-tooth waveform generation circuit 4 which generates and outputs the saw-tooth waveform signal RAMP having the same frequency as a PWM frame frequency, a control circuit 5 which controls operations of the switching transistor M1 and the synchronization rectification transistor M2 according to the output signal from the error amplification circuit 3.

Note that the switching transistor M1 corresponds to the switching unit in claims; and the synchronization rectification transistor M2 corresponds to the rectification unit in claims, the reference voltage generation circuit 2, the error amplification circuit 3, the saw-tooth waveform generation circuit 4, and the control circuit 5 constitute the control circuit in claims.

In addition, the above components, except for the inductor L1 and the smoothing capacitor C1, can be integrated into one IC (Integrated Circuit) chip; if necessary, the above components, except for the inductor L1 and the smoothing capacitor C1, the switching transistor M1, and the synchronization rectification transistor M2, can be integrated into one IC (Integrated Circuit) chip.

The switching transistor M1 and the synchronization rectification transistor M2 are connected in series between the input terminal IN and ground, the inductor L is connected between the output terminal OUT and the connecting portion of the switching transistor M1 and the synchronization rectification transistor M2, and the capacitor C is connected between the output terminal OUT and ground.

The reference voltage Vref is input to the non-inverted input terminal of the error amplification circuit 3, and the output voltage Vout is input to the inverted input terminal of the error amplification circuit 3. In addition, the saw-tooth waveform signal RAMP is input to the error amplification circuit 3, so that the error amplification circuit 3 constitutes a non-linear amplifier which has a gain linearly varying in proportion to the voltage of the saw-tooth waveform signal RAMP. An output terminal of the error amplification circuit 3 is connected to the control circuit 5. The control circuit 5 outputs a control signal PHS to the gate of the switching transistor M1, and outputs a control signal NLS to the gate of the synchronization rectification transistor M2.

In the above structure, the error amplification circuit 3 amplifies the error voltage between the output voltage Vout and the reference voltage Vrel, and generates and outputs a PWM pulse signal Spwm. The control circuit 5 controls switching of the switching transistor M1 and the synchronization rectification transistor M2 in response to the input PWM pulse signal Spwm.

The switching regulator 1 performs control as described below.

When the output voltage Vout of the switching regulator 1 becomes high, the duty cycle of the PWM pulse signal Spwm output from the error amplification circuit 3 becomes low. As a result, the time period when the switching transistor M1 is ON becomes short, and accordingly, the time period when the synchronization rectification transistor M2 is ON becomes long; thus the output voltage Vout of the switching regulator 1 falls.

When the output voltage Vout of the switching regulator 1 becomes low, the duty cycle of the PWM pulse signal Spwm output from the error amplification circuit 3 becomes short. As a result, the time period when the switching transistor M1 is ON becomes long, and accordingly, the time period when the synchronization rectification transistor M2 is ON becomes short; thus the output voltage Vout of the switching regulator 1 rises.

When the above control operations are repeated, the output voltage Vout is controlled to be a certain constant value.

Operations of the error amplification circuit 3 are explained with reference to FIG. 2.

Figure 2:
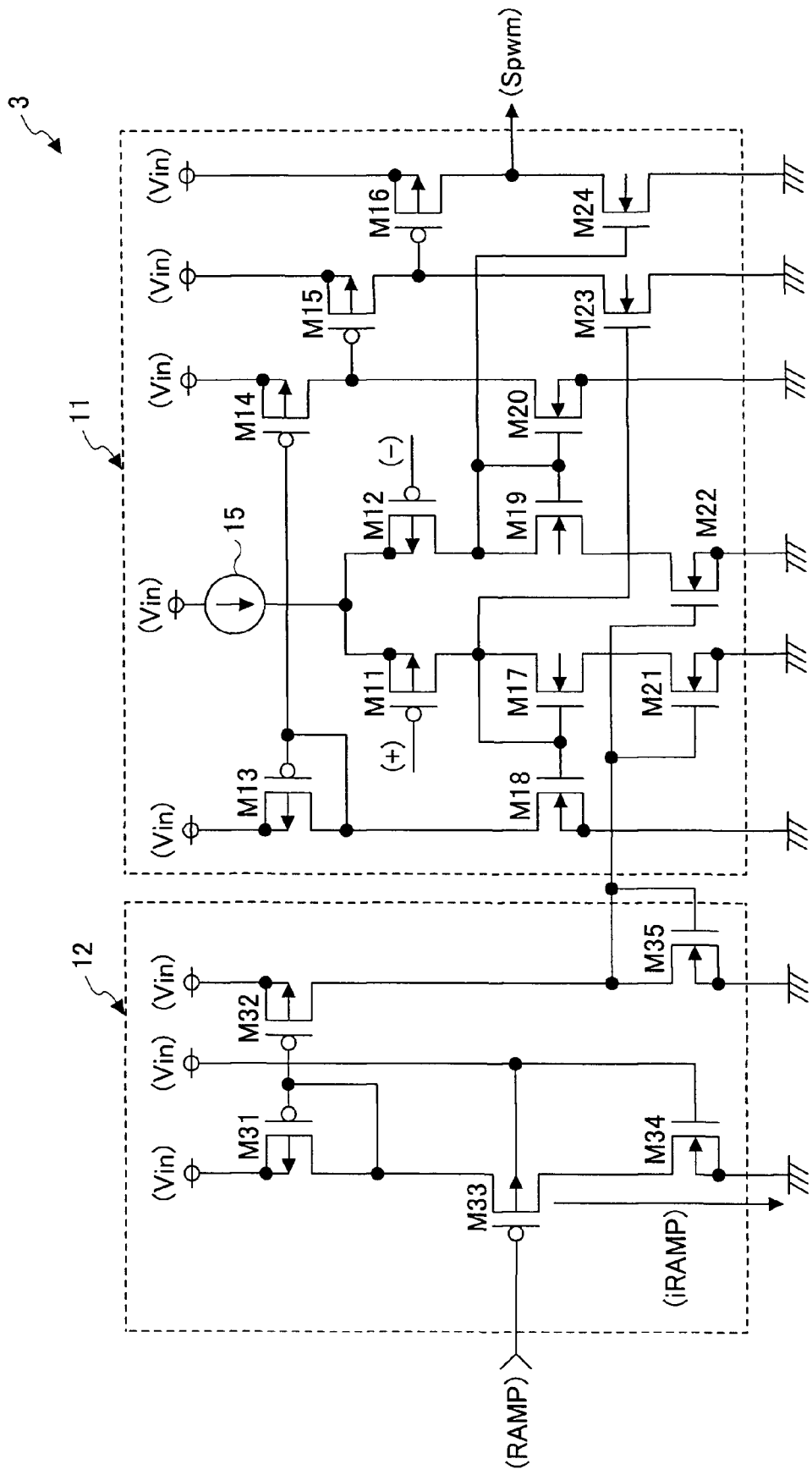
FIG. 2 is a circuit diagram illustrating the error amplification circuit 3 of the present embodiment of the present invention.

FIG. 2 is a circuit diagram illustrating the error amplification circuit 3 of the present embodiment of the present invention.

In FIG. 2, the error amplification circuit 3 includes a differential amplifier circuit 11 and a gain control circuit 12 which changes a bias current of the differential amplifier circuit 11 according to the voltage of the saw-tooth waveform signal RAMP, and controls the gain of the differential amplifier circuit 11.

The differential amplifier circuit 11 includes PMOS transistors M11 through M16, NMOS transistors M17 through M25, and a constant current source 15. The PMOS transistors M11, M12 constitute a differential pair.

The gain control circuit 12 includes NMOS transistors M31 through M33, and NMOS transistors M34 and M35.

Sources of the PMOS transistors M11 and M12 are connected in the differential amplifier circuit 11, the constant current source 15 is connected between the input voltage Vin and the connecting portion of the sources of the PMOS transistors M11 and M12 in the differential amplifier circuit 11. The NMOS transistors M17 and M21 are connected in series between the drain of the PMOS transistors M11 and ground, and the NMOS transistors M19 and M22 are connected in series between the drain of the PMOS transistors M12 and ground. The gate of the PMOS transistor M11 serves as the non-inverted input terminal of the error amplification circuit 3, and the gate of the PMOS transistors M12 serves as the inverted input terminal of the error amplification circuit 3. Gates of the NMOS transistors M17 and M18 are connected to each other, and the connection portion of the gates of the NMOS transistors M17 and M18 is connected to the drain of the NMOS transistors M17. Similarly, gates of the NMOS transistors M19 and M20 are connected to each other, and the connection portion of the gates of the NMOS transistors M19 and M20 is connected to the drain of the NMOS transistors M19.

The PMOS transistor M13 and the NMOS transistor M18 are connected in series between the input voltage Vin and ground; similarly, the PMOS transistor M14 and the NMOS transistor M20 are also connected in series between the input voltage Vin and ground. The PMOS transistors M13, M14 constitute a current mirror circuit, the sources of the PMOS transistors M13, M14 are connected to the input voltage Vin, the gates of the PMOS transistors M13 and M14 are connected to each other, and are connected to the drain of the PMOS transistors M13.

The PMOS transistor M15 and the NMOS transistor M23 are connected in series between the input voltage Vin and ground, the gate of the PMOS transistor M15 is connected to the connecting portion of the PMOS transistor M14 and the NMOS transistor M20, and the gate of the NMOS transistor M23 is connected to the connecting portion of the gates of the NMOS transistor M17 and the NMOS transistor M18.

The PMOS transistor M16 and the NMOS transistor M24 are connected in series between the input voltage Vin and ground, the gate of the PMOS transistor M16 is connected to the connecting portion of the PMOS transistor M15 and the NMOS transistor M23, and the gate of the NMOS transistor M24 is connected to the connecting portion of the gates of the NMOS transistor M19 and the NMOS transistor M20.

The connecting portion of the PMOS transistor M16 and the NMOS transistor M24 serves as an output terminal of the error amplification circuit 3, and the PWM pulse signal Spwm is output from this connecting portion.

In the gain control circuit 12, the PMOS transistors M31, M33 and the NMOS transistor M34 are connected in series between the input voltage Vin and ground, the saw-tooth waveform signal RAMP is input to the gate of the PMOS transistor M33. A substrate gate of the PMOS transistor M33 and the gate of the NMOS transistor M34 are connected to the input voltage Vin. The PMOS transistors M31, M32 constitute a current mirror circuit, the sources of the PMOS transistors M31, M32 are connected to the input voltage Vin, the gates of the PMOS transistors M31 and M32 are connected to each other, and are connected to the drain of the PMOS transistor M31. The NMOS transistor M35 is connected between the drain of the PMOS transistors M32 and ground. The NMOS transistor M35 and the NMOS transistors M21, M22 constitute a current mirror circuit. The gates of the NMOS transistor M35 and the NMOS transistors M21, M22 are connected to each other; the connection portion of the NMOS transistor M35 and the NMOS transistors M21, M22 is connected to the drain of the NMOS transistor M35.

In the gain control circuit 12, since the gate of the NMOS transistor M34 is connected to the input voltage Vin, the NMOS transistor M34 operates in a linear region, and a saw-tooth waveform current iRAMP proportional to the saw-tooth waveform signal RAMP flows in the NMOS transistor M34.

The saw-tooth waveform current iRAMP is returned by the current mirror circuit including the PMOS transistors M31, M33, and is supplied to the drain of the NMOS transistor M35. Since the NMOS transistor M35 and the NMOS transistors M21, M22 constitute a current mirror circuit, a current which flows in the NMOS transistor M35 and is proportional to the saw-tooth waveform current iRAMP flows in the NMOS transistors M21 and M22. For this reason, currents, as bias currents, proportional to the saw-tooth waveform currents iRAMP flow in the PMOS transistors M11, M12, respectively, which constitute a differential pair.

In a common differential amplification circuit, a current variation in accordance with a voltage difference between transistors of a differential pair flows in fixed loads, such as resistors, which constitutes the load of the differential pair; thus the current variation is amplified at a certain gain as a voltage variation. On the other hand, in the differential amplifier circuit 11, instead of the fixed loads, the NMOS transistors M21 and M22 are used as the load of the differential pair, and the resistance of the NMOS transistors M21 and M22 changes linearly along with the saw-tooth waveform currents iRAMP, so that the gain of the error voltage between the reference voltage Vref and the output voltage Vout, which error voltage is input to the gates of the PMOS transistors M11, M12, constituting a differential pair, changes linearly.

Generally, in the PWM control of the related art, the gain of the PWM pulses is determined by the amplitude and the slope of the triangular waveform signal used for PWM modulation. In contrast, in the present embodiment, the gain of the PWM pulses is determined by the amplitude of the saw-tooth waveform current iRAMP, a variation of the resistance of the NMOS transistors M21 and M22 in the ON state, and the slope of the saw-tooth waveform current iRAMP. In the differential amplifier circuit 11, the error voltage of the voltages input to the non-inverted input terminal and the inverted input terminal is amplified at a gain changing in conformity with a linear relationship determined by the saw-tooth waveform current iRAMP. Further, the gain changing in conformity with the linear relationship determined by the saw-tooth waveform current iRAMP is such that the gain becomes a preset PWM gain. Therefore, it is possible to perform PWm modulation of the error voltage between the reference voltage Vref and the output voltage Vout.

In FIG. 1, the step-down switching regulator is explained as an example. In the case of a step up switching regulator, instead of the structure in FIG. 1, the structure in FIG. 3 is used.

Figure 3:
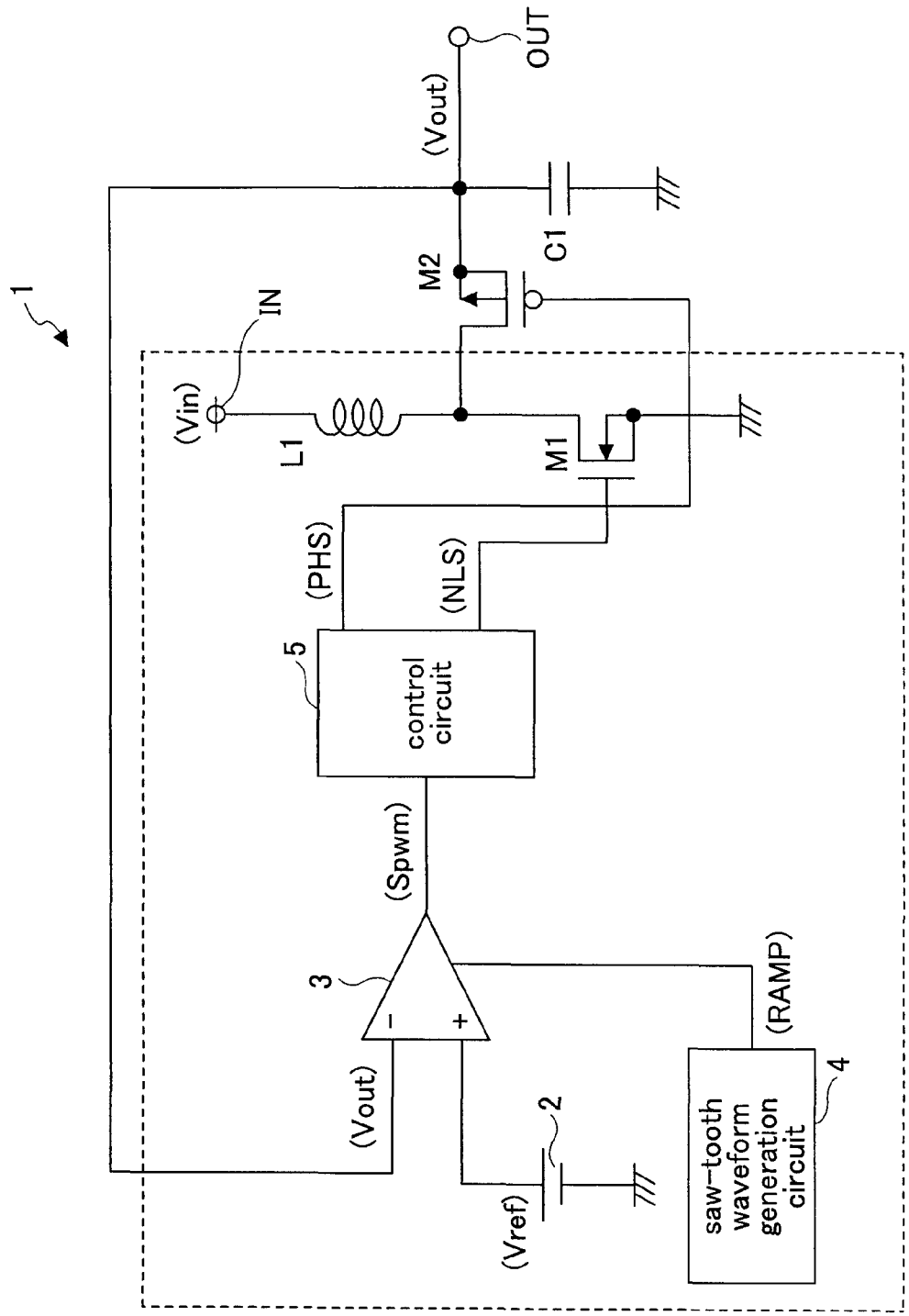
FIG. 3 is a block diagram illustrating another example of the switching regulator of the present embodiment.
Figure 4:
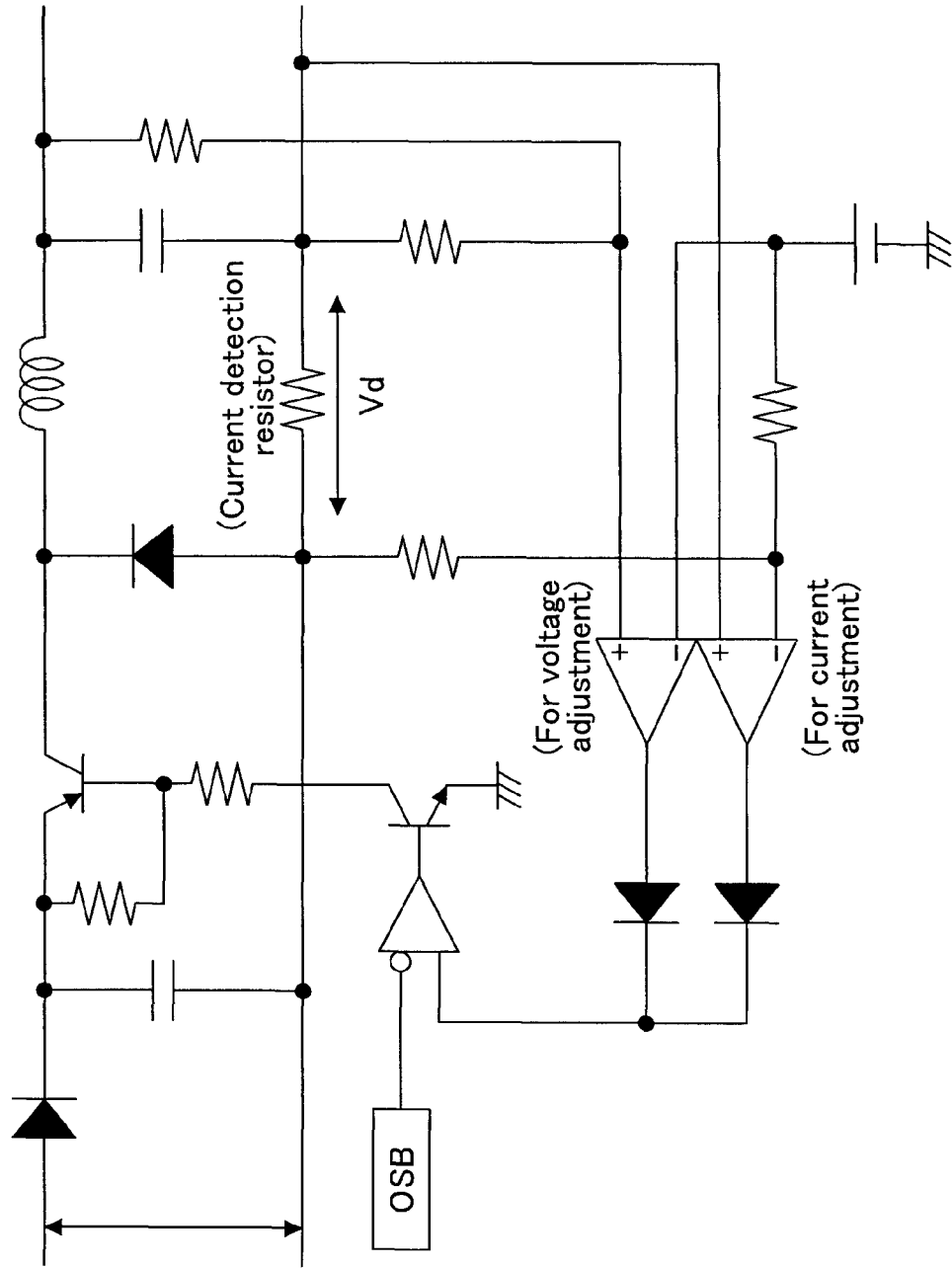
FIG. 4 is a circuit diagram illustrating a circuit configuration of a switching regulator of the related art.

FIG. 3 is a block diagram illustrating another example of the switching regulator of the present embodiment.

In FIG. 3, the same reference numbers are assigned to the same components as described in FIG. 1.

The switching regulator shown in FIG. 3 is different from the switching regulator shown in FIG. 1 in that the switching transistor M1 in FIG. 1 is replaced by an NMOS transistor, the synchronization rectification transistor M2 in FIG. 1 is replaced by a PMOS transistor, and the connection relationship between the inductor L1, the switching transistor M1, and the synchronization rectification transistor M2 is changed so that the control signal NLS is input to the gate of the switching transistor M1 in FIG. 3, and the control signal PHS is input to the gate of the synchronization rectification transistor M2 in FIG. 3. Since the other part of the structure in FIG. 3 is the same as that in FIG. 1, descriptions of the operations of the switching regulator in FIG. 3 are omitted.

In the above, the synchronization rectification switching regulator is described as an example, but the present invention is also applicable to a non-synchronization rectification switching regulator. In this case, it is sufficient to replace the synchronization rectification transistor M2 in FIG. 1 with a diode which has an anode connected to ground, and a cathode connected to a connecting portion of the switching transistor M1 and the inductor L1, or to replace the synchronization rectification transistor M2 in FIG. 3 with a diode which has an anode connected to a connecting portion of the switching transistor M1 and the inductor L1, and a cathode connected to the output terminal OUT.

In the above, a step-up switching regulator and a step-down switching regulator are described as examples, but the present invention is also applicable to switching regulators for inversion control or for both step-up and step-down control.

According to the above embodiments, the error amplification circuit 3 constitutes a non-linear amplifier which has a gain linearly varying in response to the saw-tooth waveform signal RAMP generated by the saw-tooth waveform generation circuit 4. The gain of the error amplification circuit 3 is variable in response to the saw-tooth waveform signal RAMP when amplifying the error voltage between the output voltage Vout and the reference voltage Vrel. The control circuit 5 performs PWM modulation on the error voltage, generates a PWM pulse signal Spwm, and controls switching of the switching transistor M1 and the synchronization rectification transistor M2 in response to the PWM pulse signal Spwm. Thus, it is not necessary to provide a comparator for PWM modulation of an error signal obtained by amplifying the error voltage between the output voltage Vout and the reference voltage Vref, the circuit structure is simple, and it is possible to perform PWM control at high frequencies without increasing current consumption.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2007-236580 filed on Sep. 12, 2007, the entire contents of which are hereby incorporated by reference.

What is claimed is:

1. A switching regulator which converts an input voltage supplied to an input terminal to a predetermined constant voltage and outputs the constant voltage through an output terminal as an output voltage, comprising:
   a switching unit that performs switching according to an input control signal;
   an inductor that is charged by the input voltage in response to the switching of the switching unit;
   a rectification unit that discharges the inductor when the switching unit is switched OFF and the charging of the inductor stops;
   a control circuit that controls the switching of the switching unit so that the output voltage becomes the constant voltage,
   wherein
   the control circuit uses a pulse signal to perform PWM control on the switching unit, said pulse signal being generated by amplifying an error voltage between the output voltage and a predetermined reference voltage at a gain variable in response to a voltage of a predetermined saw-tooth waveform signal;
   wherein the control circuit includes
     a saw-tooth waveform generation circuit that generates and outputs the saw-tooth waveform signal, and
     an error amplification circuit that amplifies the error voltage between the output voltage and the predetermined reference voltage to generate and output the pulse signal, and changes the gain according to the saw-tooth waveform signal output from the saw-tooth waveform generation circuit,
   wherein the error amplification circuit includes
     a differential amplifier circuit that receives the output voltage and the reference voltage through corresponding input terminals and
     a gain control circuit that controls the gain of the differential amplifier circuit according to the saw-tooth waveform signal output from the saw-tooth waveform generation circuit,
   wherein the gain control circuit, according to the saw-tooth waveform signal, changes a bias current to be supplied to each of input transistors constituting a differential pair of the differential amplifier circuit, the output voltage and the reference voltage being input in association with each other to control electrodes of the input transistors, respectively.

2. The switching regulator as claimed in claim 1, wherein the differential amplifier circuit includes:
   the input transistors constituting a differential pair;
   a constant current source that supplies a predetermined constant current to the input transistors; and
   a plurality of variable resistors that have resistance variable in response to an input control signal, and act as loads of the corresponding input transistors;
   wherein
   the gain control circuit allows the resistance of the variable resistors to be variable according to the saw-tooth waveform signal.

3. The switching regulator as claimed in claim 2, wherein each of the variable resistors includes a transistor, a control signal from the gain control circuit is input on control electrodes of the transistors, and the gain control circuit allows the resistance of the transistors in an ON state to be variable according to the saw-tooth waveform signal.

* * * * *